United States Patent
Denninger et al.

(10) Patent No.: US 9,403,506 B2
(45) Date of Patent: Aug. 2, 2016

(54) RETRACTABLE SEATBELT POSITIONER WITH STOWAGE FEATURE

(71) Applicants: Melinda M Denninger, Oxford, MI (US); Paul C Tresnak, Royal Oak, MI (US); Rachel Cacossa, Shelby Township, MI (US)

(72) Inventors: Melinda M Denninger, Oxford, MI (US); Paul C Tresnak, Royal Oak, MI (US); Rachel Cacossa, Shelby Township, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 14/538,309

(22) Filed: Nov. 11, 2014

(65) Prior Publication Data
US 2016/0129878 A1    May 12, 2016

(51) Int. Cl.
*B60R 22/24* (2006.01)
*B60R 22/28* (2006.01)
*B60R 22/34* (2006.01)
*B60R 22/02* (2006.01)
*B60R 22/18* (2006.01)

(52) U.S. Cl.
CPC ............ *B60R 22/28* (2013.01); *B60R 22/023* (2013.01); *B60R 22/24* (2013.01); *B60R 22/34* (2013.01); *B60R 2022/1818* (2013.01); *B60R 2022/3402* (2013.01)

(58) Field of Classification Search
CPC .... B60R 22/03; B60R 22/024; B60R 22/023; B60R 22/02; B60R 22/24; B60R 22/19; B60R 22/04; B60R 22/06; B60R 2022/1818; B60R 2022/1831; B60R 2022/1843
USPC .................................. 280/808; 297/481, 483
See application file for complete search history.

(56) References Cited

U.S. PATENT DOCUMENTS

| | | | |
|---|---|---|---|
| 4,648,625 A | 3/1987 | Lynch | |
| 5,308,116 A | 5/1994 | Zawisa et al. | |
| 5,704,645 A * | 1/1998 | Arthurs | B60R 22/28 188/374 |
| 6,880,893 B1 * | 4/2005 | Scotton | B60R 22/024 280/808 |
| 7,513,532 B1 | 4/2009 | Vaughns, Sr. et al. | |
| 2005/0017116 A1 * | 1/2005 | Kempf | B60R 22/3413 242/381 |
| 2007/0040371 A1 * | 2/2007 | Armstrong | B60R 22/03 280/801.1 |
| 2010/0301594 A1 * | 12/2010 | Hathaway | B60R 22/26 280/808 |

FOREIGN PATENT DOCUMENTS

| | | | | |
|---|---|---|---|---|
| DE | 4032383 C1 * | 3/1992 | | B60R 22/03 |
| GB | 2235361 A * | 3/1991 | | B60R 22/03 |
| SE | WO 2006052186 A1 * | 5/2006 | | B60R 22/03 |

* cited by examiner

*Primary Examiner* — Keith Frisby
(74) *Attorney, Agent, or Firm* — Ralph E. Smith

(57) ABSTRACT

The present teachings provide for a vehicle seatbelt positioner. The vehicle can include a pillar and seatbelt. The seatbelt positioner can include a cassette, router, and tether. The cassette can be mounted to a first side of the pillar. The router can include a guide body configured to releasably couple the router to the seatbelt. The router can be movable between an extended position in which the router is spaced apart from the pillar, and a retracted position in which the router contacts the pillar. The tether can have a first end coupled to the cassette and a second end coupled to the router. When the router is in the extended position, the tether can extend through an aperture defined by the pillar to a second side of the pillar. The cassette can be configured to retract the tether toward the cassette to position the router in the retracted position.

14 Claims, 4 Drawing Sheets

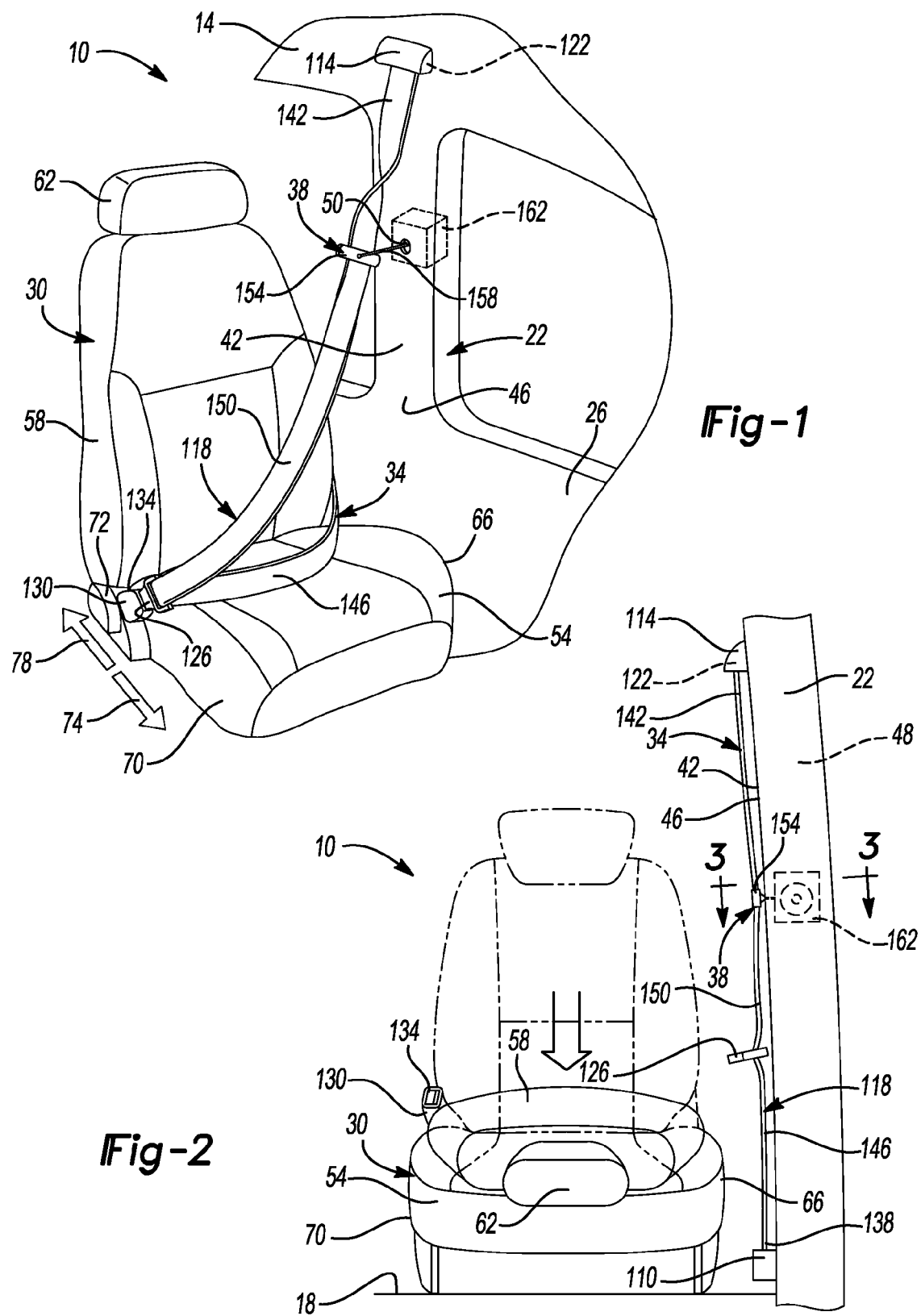

RETRACTABLE SEATBELT POSITIONER WITH STOWAGE FEATURE

FIELD

The present disclosure relates to a retractable seatbelt positioner with a stowage feature.

BACKGROUND

This section provides background information related to the present disclosure and is not necessarily prior art.

Vehicles conventionally have a seat configured for an occupant to sit in a passenger compartment of the vehicle, and a seatbelt configured to restrain the passenger in the seat. Seatbelts typically include a webbing material that forms a lap restraint, and a chest restraint. The lap restraint is configured to span the occupant's lap to restrain the occupant proximate to his/her lap. The chest restraint is configured to cross the occupant's chest diagonally from the occupant's shoulder, to his/her lap. A first end of the webbing is typically coupled to the vehicle body on one side of the seat proximate to the floor of the vehicle. A second end of the webbing is typically routed through a webbing guide mounted to a vertical pillar of the vehicle on the same side of the seat and proximate to a header of the vehicle. The lap and chest restraint portions of the webbing are delineated by a buckle configured to slide along the webbing and to releasably couple the webbing to a mating buckle that is mounted to the vehicle proximate to the floor on an opposite side of the seat. Proper positioning of the chest restraint across the occupant's chest can be important for proper restraint of the occupant. Proper positioning of the chest restraint can be difficult for occupants of smaller stature. Furthermore, when the seatbelt is not buckled, the webbing is free to catch on the seat or become caught behind the seat, thus inhibiting the reclining, folding or other positioning of the seat, as well as inhibiting access to the seatbelt.

SUMMARY

This section provides a general summary of the disclosure, and is not a comprehensive disclosure of its full scope or all of its features.

The present teachings provide for a seatbelt positioner for a vehicle. The vehicle can include a pillar and a seatbelt. The seatbelt positioner can include a cassette, a router, and a tether. The cassette can be mounted to a first side of the pillar. The router can include a guide body configured to releasably couple the router to a portion of the seatbelt. The router can be movable between an extended position in which the router is spaced apart from the pillar, and a retracted position in which the router contacts the pillar. The tether can have a first end coupled to the cassette and a second end coupled to the router. When the router is in the extended position, the tether can extend through an aperture defined by the pillar to a second side of the pillar. The cassette can be configured to retract the tether toward the cassette to position the router in the retracted position.

The present teachings further provide for the cassette including a spool and a biasing member. The spool can be rotatable relative to the pillar. The first end of the tether can be coupled to the spool. The biasing member can be configured to bias the spool toward a first rotational position in which said tether can be wound onto said spool.

The present teachings further provide for the router including a mount that can be coupled to the guide body and at least partially received in the aperture defined by the pillar.

The present teachings further provide for the second end of the tether being coupled to the mount.

The present teachings further provide for the mount having a generally conical shape.

The present teachings further provide for the mount being a generally cylindrical shape having a diameter less than a diameter of the aperture defined by the pillar.

The present teachings further provide for the router including a bulb spaced apart from the guide body by the mount. The bulb can have a diameter that is less than the mount.

The present teachings further provide for the router including a bulb spaced apart from the guide body by the mount. The bulb can have a diameter that is greater than the mount.

The present teachings further provide for at least a portion of the mount being formed of a compressive material configured to dampen motion of the router relative to the pillar when the mount is received in the aperture defined by the pillar.

The present teachings further provide for the router including a mount, a bulb, and a nub. The bulb can be spaced apart from the guide body by the mount and can have a diameter that is greater than the aperture in the pillar. The nub can be on a side of the bulb opposite the mount and can have a diameter that is less than the aperture defined by the pillar.

The present teachings further provide for the guide body being generally C-shaped. The portion of the seatbelt can be removably received through an opening of the C-shaped guide body.

The present teachings further provide for the cassette being disposed within the pillar The present teachings further provide for the router including a mount coupled to the guide body on a side of the guide body that is opposite the opening. The mount can be configured to be at least partially received in the aperture defined by the pillar.

The present teachings further provide for the cassette being disposed within the pillar.

The present teachings further provide for the cassette being separated from a passenger compartment of the vehicle by the pillar.

The present teachings further provide for the cassette being at least partially surrounded by a pillar trim panel of the pillar.

The present teachings further provide for a seatbelt positioner for a vehicle. The vehicle can include a pillar and a seatbelt. The seatbelt positioner can include a cassette, a guide body, a mount, and a tether. The cassette can be mounted to the pillar. The guide body can define a channel configured to receive a portion of the seatbelt. The guide body can be configured to releasably retain the portion of the seatbelt within the channel. The mount can be coupled to the guide body. The tether can have a first end coupled to the cassette and a second end coupled to the mount. The guide body can be movable between an extended position in which the guide body is spaced apart from the pillar, and a retracted position in which the mount contacts the pillar. The cassette can be configured to retract the tether to position the guide body in the retracted position.

The present teachings further provide for the cassette including a spool and a biasing member. The spool can be rotatable relative to the pillar. The first end of the tether can be coupled to the spool. The biasing member can be configured to bias the spool toward a first rotational position in which the tether is retracted.

The present teachings further provide for the cassette being disposed on a first side of the pillar and the guide body being disposed on a second side of the pillar that is opposite the first side. The tether can extend through an aperture defined by the pillar.

The present teachings further provide for the mount including a conical protrusion at least partially received in the aperture that is defined by the pillar when the guide body is in the retracted position.

The present teachings further provide for the mount including a cylindrical protrusion at least partially received in the aperture that is defined by the pillar when the guide body is in the retracted position.

The present teachings further provide for at least a portion of the mount being formed of a compressive material configured to dampen motion of the guide body relative to the pillar when the guide body is in the retracted position.

The present teachings further provide for the guide body being generally C-shaped. The portion of the seatbelt can be removably received through an opening of the C-shaped guide body.

The present teachings further provide for the cassette is disposed within the pillar Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1 is a perspective view of a portion of a vehicle including a pillar and a seatbelt positioner of a first construction and in a first position in accordance with the present disclosure;

FIG. 2 is a front view of the portion of the vehicle and the seatbelt positioner of FIG. 1 in a stowed position;

Corresponding reference numerals indicate corresponding parts throughout the several views of the drawings.

DETAILED DESCRIPTION

Figure 3:
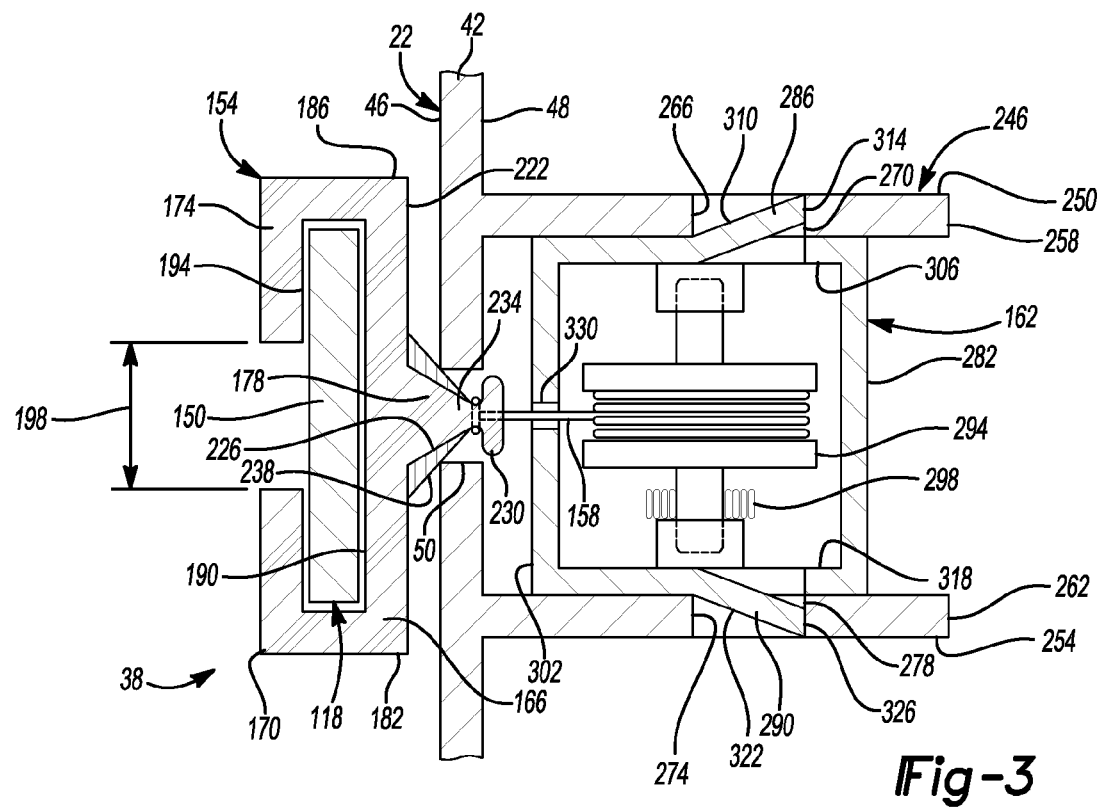
FIG. 3 is a sectional view of the seatbelt positioner and the pillar taken along line 3-3 of FIG. 2, illustrating a bracket, a cassette and a seatbelt router of a first construction.

Example embodiments will now be described more fully with reference to the accompanying drawings.

Example embodiments are provided so that this disclosure will be thorough, and will fully convey the scope to those who are skilled in the ark. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

With reference to FIGS. 1 and 2, a portion of a vehicle 10 is illustrated. The vehicle 10 can be any type of vehicle, such as an automobile, truck, sport utility vehicle, recreational vehicle, bus, or military vehicle for example. The vehicle 10 includes a header 14, a floor 18, a pillar 22, a door 26, a seat 30, a restraint system 34, and a restraint positioner 38.

The header 14 extends longitudinally along the top of the vehicle 10 and supports a roof (not shown) of the vehicle 10. The floor 18 is spaced apart from the header 14 and extends along the bottom of the vehicle 10, proximate to the ground (not shown) during normal operation of the vehicle 10. The pillar 22 is coupled to the header 14 and the floor 18 and extends generally vertically therebetween to support the header 14. In the example provided, the seat 30 is a front seat and the pillar 22 is a B-pillar of the vehicle 10, though other seat locations and appropriate pillars can be used. The pillar 22 includes a pillar trim panel 42. The pillar trim panel 42 can be formed of a thermoplastic material, for example, and has an interior side 46 that generally faces toward a passenger compartment or interior of the vehicle 10 and an exterior side 48 that generally faces away from the interior of the vehicle 10. The pillar trim panel 42 includes an aperture 50 that extends through the interior and exterior sides 46, 48. The door 26 is framed by the pillar 22, the header 14, the floor 18, and an additional pillar (not shown) such as an A-pillar for example. The door 26 is configured to permit ingress and egress of an occupant (not shown) from the vehicle 10.

The seat 30 is configured to permit the occupant to sit within the vehicle 10. The seat 30 includes a lower support 54, an upper support 58, and a head rest 62. The seat 30 has a first side 66 proximate to the pillar 22 and a second side 70 opposite the first side 66 and distal to the pillar 22. The lower support 54 is configured to be sat on by the occupant to support the occupant above the floor 18. The upper support 58 is configured to extend generally vertically from the lower support 54 when the seat 30 is in an upright position (FIG. 1), to provide support to the occupant's back and upper body. The upper support 58 is joined to the lower support 54 by a first seat mechanism 72. The first seat mechanism 72 is configured to permit the upper support 58 to move or rotate relative to the lower support 54 between various positions, such as the upright position (FIG. 1), a reclined position (not shown), or a folded position (shown in solid lines in FIG. 2). The head rest 62 is configured to extend generally vertically from the upper support 58 when the seat 30 is in the upright position, to provide support for the occupant's head. The seat 30 is coupled to the floor 18 by a second seat mechanism (not shown). The second seat mechanism is configured to permit the seat 30 to move relative to the floor 18 in a forward direction 74 and a rearward direction 78. While illustrated as a single occupant seat, the seat 30 can alternatively be configured to support multiple occupants, such as with a bench seat for example.

The restraint system 34 includes a lower mount 110, an upper mount 114, a seatbelt 118, a retracting mechanism 122, a buckle 126, a buckle arm 130, and a mating buckle 134. The lower mount 110 is coupled to the vehicle 10 proximate to the first side 66 of the seat 30 and proximate to the floor 18. For example, the lower mount 110 can be mounted to the floor 18 at the first side 66 of the seat 30 or to the pillar 22 proximate to the floor 18. The upper mount 114 is coupled to the vehicle 10 on the first side 66 of the seat 30 and proximate to the header 14. For example, the upper mount 114 can be mounted to the header 14 or to the pillar 22 proximate to the header 14.

The seatbelt 118 is formed of a webbing material or fabric and has a first end 138 and a second end 142. The first end 138 is coupled to the vehicle 10 at the lower mount 110. The second end 142 is coupled to the vehicle 10 at the upper mount 114. In some configurations, the upper mount 114 can be a guide through which the seatbelt 118 is slidably routed to a third mount (not shown) that can be mounted to the pillar 22 between the upper mount 114 and the floor 18.

The buckle 126 is coupled to the seatbelt 118 such that the buckle 126 slides along the seatbelt 118. The location of the buckle 126 delineates the seatbelt 118 into a lap portion 146 and a chest portion 150, such that the lengths of the lap and chest portions 146, 150 vary depending on the position of the buckle 126 along the seatbelt 118. The lap portion 146 is configured to span the occupant's lap to restrain the occupant in the seat 30 proximate to the occupant's waist. The chest portion 150 is configured to cross the occupant's chest diagonally, such as from the occupant's shoulder to the occupant's waist.

The buckle arm 130 is coupled to the vehicle 10 on the second side 70 of the seat 30 and proximate to the floor 18. For example, the buckle arm 130 can be mounted to the second side 70 of the seat 30 near a junction of the lower and upper supports 54, 58, or to the floor 18 near the second side 70 of the seat 30. The mating buckle 134 is mounted to the buckle arm 130 and configured to releasably latch or connect to the buckle 126 to hold the seatbelt 118 in a connected position (FIG. 1).

In the example provided, the retracting mechanism 122 is located at the upper mount 114 and can wind the seatbelt 118 around a spool (not shown). In some configurations, the retracting mechanism 122 could be disposed at any other suitable location, such as at the lower mount 110 or at a location between the upper and lower mounts 114, 110 for example. The retracting mechanism 122 is configured to retract the seatbelt 118 and to permit extension of the seatbelt 118. The retracting mechanism 122 is configured to inhibit extension of the seatbelt 118 during sudden deceleration of the vehicle 10, such as during a crash event for example.

With additional reference to FIG. 3, a portion of the pillar trim panel 42 and seatbelt 118 are illustrated with the restraint positioner 38 in more detail. The restraint positioner 38 includes a seatbelt router 154, a cable or tether 158, and a cassette 162. The seatbelt router 154 is configured to be releasably coupled to the chest portion 150 of the seatbelt 118. The seatbelt router 154 includes a base 166, a pair of prongs 170, 174, and a stowage member or mount 178. In the example provided, the seatbelt router 154 is a unitarily formed thermoplastic material, though other configurations and/or materials can be used. The prongs 170, 174 extend from opposite ends 182, 186 of the base 166 and away from a first side 190 of the base 166 to define a main channel 194. The prongs 170, 174 extend toward each other to cover a portion of the main channel 194 and to define a gap 198 between the prongs 170, 174. In this way, the base 166 and prongs 170, 174 form a generally "C" shaped cross section. The main channel 194 has a width that is greater than or equal to a width of the seatbelt 118 and has a thickness that is greater than or equal to a thickness of the seatbelt 118 such that the seatbelt 118 can be received within the main channel 194. The gap 198 has a width that is less than the width of the seatbelt 118 and greater than the thickness of the seatbelt 118. In this manner, the seatbelt 118 can be inserted into the main channel 194 through the gap 198 so that the seatbelt router 154 can slidably retain the seatbelt 118 within the main channel 194. The gap 198 also allows the occupant to remove the seatbelt 118 from the seatbelt router 154.

The mount 178 extends from a second side 222 of the base 166, opposite the first side 190. The mount 178 is coupled to the tether 158 and can be at least partially received in the aperture 50 of the pillar trim panel 42. The mount 178 includes a protrusion 226 and a bulb 230. In the example provided the protrusion 226 includes a generally conical or frustoconical shape, having a wider diameter proximate to the second side 222 of the base 166 and narrowing with distance from the base 166 to a terminal end 234. The mount 178 can also optionally include a vibration damper 238. In the example provided, the vibration damper 238 is a layer of vibration damping material (e.g. foam, rubber, or a compressible plastic) disposed about the protrusion 226. Alternatively, the protrusion 226 itself can be formed of the vibration damping material. The vibration damper 238 is configured to seat on the pillar trim panel 42 in the aperture 50 to absorb vibrations between the seatbelt router 154 and the pillar trim panel 42 to inhibit rattling of the seatbelt router 154 relative to the pillar trim panel 42.

The bulb 230 is coupled to the terminal end 234 and has a diameter wider than the terminal end 234 but narrower than the aperture 50 of the pillar trim panel 42, such that the bulb 230 can be received within the aperture 50. The tether 158 can be tied to, looped around, and/or otherwise attached to the mount 178 at the terminal end 234. The bulb 230 inhibits the tether 158 from detaching from or sliding off of the protrusion 226.

The cassette 162 is mounted within the pillar 22 and behind the pillar trim panel 42, such that the cassette 162 is coupled to the pillar trim panel 42 on the exterior side 48 of the pillar trim panel 42. The cassette 162 is mounted vertically between the upper mount 114 and the lower mount 110. The pillar trim panel 42 includes a bracket 246 for mounting the cassette 162 to the pillar trim panel 42. The bracket 246 includes a first flange 250 and a second flange 254 that extend outward from the exterior side 48 of the pillar trim panel 42 from opposite sides of the aperture 50 to first and second distal ends 258, 262. The first flange 250 defines a first slot 266 between the exterior side 48 of the pillar trim panel 42 and the first distal end 258. The first slot 266 has a first stopping surface 270 proximate to the first distal end 258 and facing generally toward the exterior side 48 of the pillar trim panel 42. The second flange 254 defines a second slot 274 between the exterior side 48 of the pillar trim panel 42 and the second distal end 262. The second slot 274 has a second stopping surface 278 proximate to the second distal end 262 and facing generally toward the exterior side 48 of the pillar trim panel 42.

The cassette 162 includes a casing 282, a first tab 286, a second tab 290, a spool 294, and a biasing member 298. The casing 282 is sized to be received between the first and second flanges 250, 254 such that a first side 302 of the casing 282 faces toward and opposes the exterior side 48 of the pillar trim panel 42. The first tab 286 extends outward from a second side 306 of the casing 282 at an angle greater than 0° and less than 90° to form a first ramped surface 310 and terminates at a first stop face 314. The first stop face 314 generally faces away from the exterior side 48 of the pillar trim panel 42 when the cassette 162 is received between the first and second flanges 250, 254. The second tab 290 extends outward from a third side 318 of the casing 282, opposite the second side 306, at an angle greater than 0° and less than 90° to form a second ramped surface 322 and terminates at a second stop face 326. The second stop face 326 generally faces away from the exterior side 48 of the pillar trim panel 42 when the cassette 162 is received between the first and second flanges 250, 254. The casing 282 is mounted to the pillar trim panel 42 by aligning the second side 306 of the casing 282 with the first flange 250, the third side 318 of the casing 282 with the second flange 254, and the first side 302 of the casing 282 toward the exterior side 48 of the pillar trim panel 42 and moving the casing 282 toward the exterior side 48 of the pillar trim panel 42. The first and second ramped surfaces 310, 322 slide along the first and second flanges 250, 254 and force the first and second flanges 250, 254 to spread apart until the first and second stop faces 314, 326 reach the first and second slots 266, 274. When the first and second stop faces 314, 326 reach the first and second slots 266, 274, the first and second flanges 250, 254 snap back toward their natural positions with the first and second tabs 286, 290 being received in the first and second slots 266, 274. In this way, the first and second stop faces 314, 326 engage the first and second stopping surfaces 270, 278 to prevent the casing 282 from being removed from between the first and second flanges 250, 254. While only first and second flanges 250, 254 are described, additional flanges (not shown) can be used.

The spool 294 and biasing member 298 are disposed within the casing 282. The spool 294 is coupled to the casing 282 for rotation relative to the casing 282. The biasing member 298 is configured to bias the spool 294 toward a first rotational position relative to the casing 282. In the example provided, the biasing member 298 is a torsional spring coupled to the spool 294 and the casing 282, though other configurations can be used. A first end of the tether 158 is coupled to the spool 294 and configured to rotate with the spool 294 to coil or wind the tether 158 around the spool 294 within the cassette 162. The first side 302 of the casing 282 defines a casing orifice 330 through which the tether 158 is configured to pass through to exit the casing 282. The casing orifice 330 aligns with the aperture 50 of the pillar trim panel 42 to permit the tether 158 to pass through the casing orifice 330 and through the aperture 50 in the pillar trim panel 42. A second end of the tether 158 is configured to be coupled to the mount 178 of the seatbelt router 154 as described above.

In operation, as the seatbelt 118 is moved into the connected position (FIG. 1) and the seatbelt 118 is received in the main channel 194 of the seatbelt router 154, the seatbelt router 154 and tether 158 are moved into an extended position in which the tether 158 unwinds off of the spool 294. In the extended position, the biasing member 298 provides sufficient force on the tether 158 to pull the seatbelt router 154 and the chest portion 150 of the seatbelt 118 toward the pillar 22. The angle at which the tether 158 pulls on the seatbelt router 154 causes the seatbelt 118 to frictionally engage with the base 166 and the prongs 170, 174 within the main channel 194 to inhibit the seatbelt router 154 from sliding relative to the seatbelt 118. While not specifically shown, the base 166 and/or the prongs 170, 174 can optionally include a non-slip surface to enhance this frictional engagement. The frictional engagement however, is insufficient to prevent the occupant from adjusting the position of the seatbelt router 154 along the chest portion 150 of the seatbelt 118. In operation, the occupant positions the seatbelt router 154 along the chest portion 150 of the seatbelt 118 such that the chest portion 150 is properly positioned across the occupant's chest, such as from the occupant's shoulder to the occupant's waist.

When the occupant disconnects the buckle 126 from the mating buckle 134, with the seatbelt 118 still received in the main channel 194 of the seatbelt router 154, the biasing member 298 provides sufficient force to retract the tether 158 onto the spool 294 and move the seatbelt router 154 and tether 158 into a retracted position (FIG. 3). That is, the biasing member 298 causes the tether 158 to automatically retract through the aperture 50 to pull the seatbelt router 154 against the pillar trim panel 42 and pull the seatbelt 118 toward the pillar 22 and into a disconnected position (FIG. 2).

In the disconnected position, a portion of the mount 178 is received in the aperture 50 of the pillar trim panel 42, as described above, to position and stow the seatbelt router 154 with the seatbelt 118 still received in the main channel 194 of the seatbelt router 154. In the example provided, the conical shaped protrusion 226 allows the mount 178 to seat in the aperture 50 from any angle of approach. When in the disconnected position, the restraint positioner 38 holds the seatbelt 118 against the pillar 22 to prevent the seatbelt 118 from becoming entangled or caught on the seat 30 or the occupant. With the restraint positioner 38 retaining the seatbelt 118 away from the seat 30 and proximate to the pillar 22, the upper support 58 is free to be reclined back or folded forward (FIG. 2), and the seat 30 is free to be moved in the forward or rearward directions 74, 78 (FIG. 1) without the seatbelt 118 becoming caught on the seat 30. Furthermore, the restraint positioner 38 also positions the seatbelt 118 against the pillar 22 such that the occupant is free to get into or out of the seat 30, enter or depart the vehicle 10 through the door 26, or otherwise move about the interior of the vehicle 10, without becoming tangled or caught on the seatbelt 118.

Figure 4:
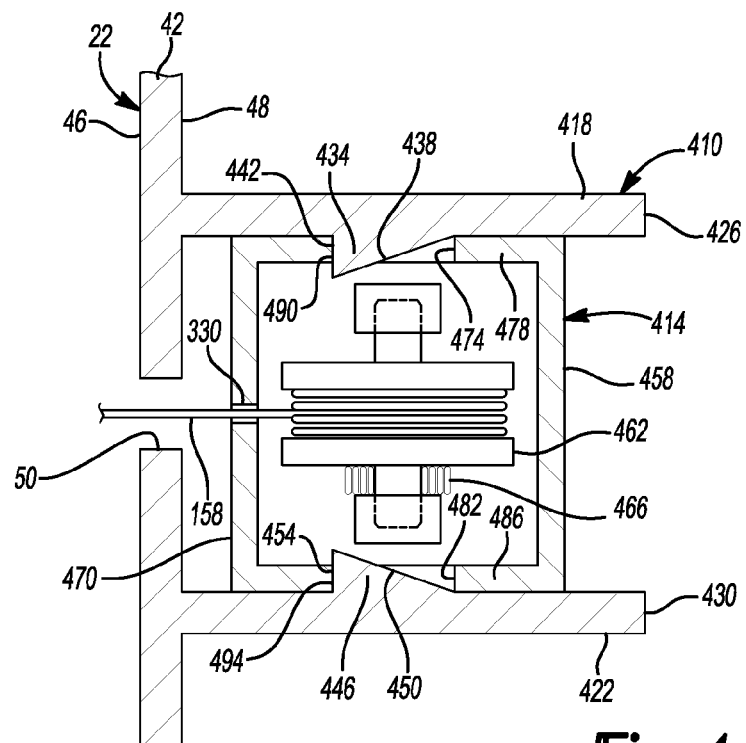
FIG. 4 is a sectional view similar to FIG. 3, of a bracket and a cassette of a second construction.

With reference to FIG. 4, a bracket 410 and a cassette 414 of a second construction are illustrated. The bracket 410 and cassette 414 can be incorporated into the restraint positioner 38 described above and can replace the bracket 246 and cassette 162. The bracket 410 includes a first flange 418 and a second flange 422 that extend outward from the exterior side 48 of the pillar trim panel 42 from opposite sides of the aperture 50 to first and second distal ends 426, 430. The first flange 418 defines a first tab 434 between the exterior side 48 of the pillar trim panel 42 and the first distal end 426. The first tab 434 extends outward from the first flange 418 toward the second flange 422 at an angle greater than 0° and less than 90° to form a first ramped surface 438 and terminates at a first stop face 442. The first stop face 442 generally faces toward the exterior side 48 of the pillar trim panel 42. The second flange 422 defines a second tab 446 between the exterior side 48 of the pillar trim panel 42 and the second distal end 430. The second tab 446 extends outward from the second flange 422 toward the first flange 418 at an angle greater than 0° and less than 90° to form a second ramped surface 450 and terminates at a second stop face 454. The second stop face 454 generally faces toward the exterior side 48 of the pillar trim panel 42.

The cassette 414 includes a casing 458, a spool 462, and a biasing member 466. The casing 458 is sized to be received between the first and second flanges 418, 422 such that a first side 470 of the casing 458 faces toward and opposes the exterior side 48 of the pillar trim panel 42. The structure and function of the casing 458, spool 462 and biasing member 466 can be similar or identical to that of the casing 282, spool 294, and biasing member 298 described above, apart from any differences described below and/or shown in the figures. Accordingly, similar features will not be described again in detail.

The casing 458 of cassette 414 defines a first slot 474 on a second side 478 of the casing 458 and a second slot 482 on a third side 486 of the casing 458, opposite the second side 478. The first slot 474 has a first stopping surface 490 proximate to the first side 470 and facing generally away from the exterior side 48 of the pillar trim panel 42 when the cassette 414 is received between the first and second flanges 418, 422. The second slot 482 has a second stopping surface 494 proximate to the first side 470 and facing generally away from the exterior side 48 of the pillar trim panel 42 when the cassette 414 is received between the first and second flanges 418, 422. The casing 458 is mounted to the pillar trim panel 42 by aligning the first side 478 of the casing 458 with the first flange 418, the second side 486 of the casing 458 with the second flange 422, and the first side 470 of the casing 458 toward the exterior side 48 of the pillar trim panel 42 and moving the casing 458 toward the exterior side 48 of the pillar trim panel 42. The first and second ramped surfaces 438, 450 slide along the first and second sides 478, 486 and force the first and second flanges 418, 422 to spread apart until the first and second stop faces 442, 454 reach the first and second slots 474, 482. When the first and second stop faces 442, 454 reach the first and second slots 474, 482, the first and second flanges 418, 422 snap back toward their natural positions with the first and second tabs 434, 446 being received in the first and second slots 474, 482. In this way, the first and second stop faces 442, 454 engage the first and second stopping surfaces 490, 494 to prevent the casing 458 from being removed from between the first and second flanges 418, 422. While only first and second flanges 418, 422 are described, additional flanges (not shown) can be used.

Figure 5:
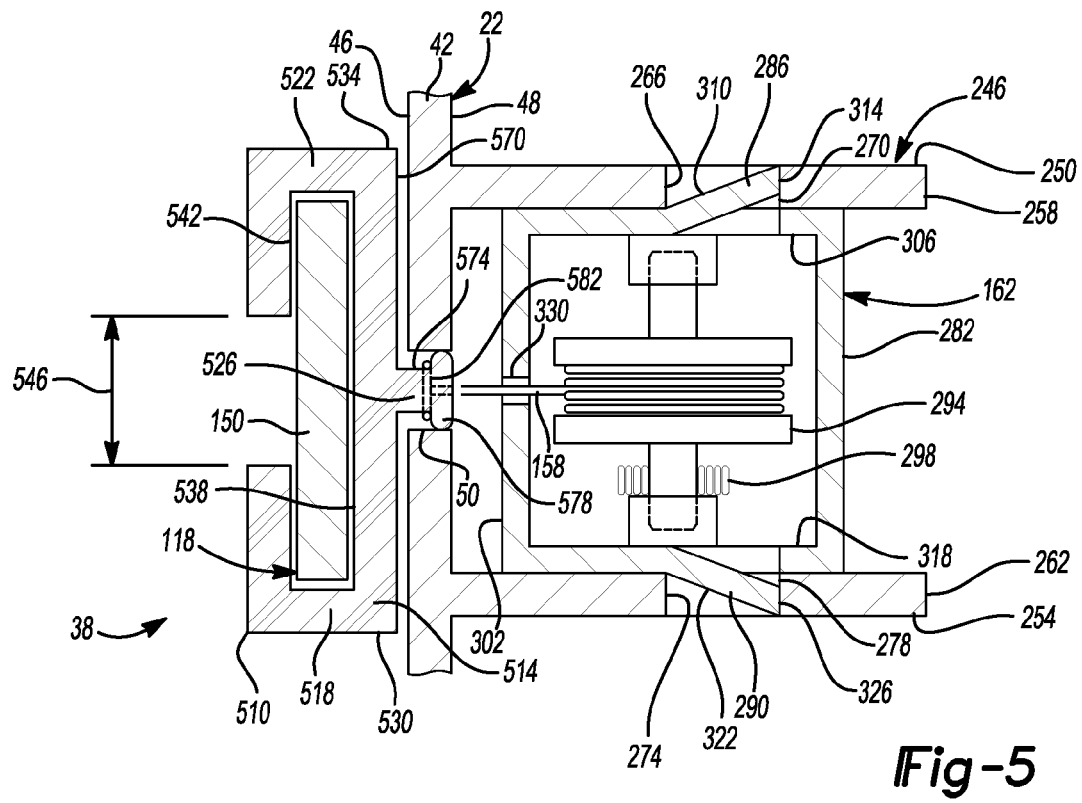
FIG. 5 is a sectional view similar to FIG. 3 illustrating the seatbelt positioner of FIG. 3 having a seatbelt router of a second construction.

With reference to FIG. 5, a seatbelt router 510 of a second construction can be incorporated into the restraint positioner 38 and can replace the seatbelt router 154 described above. The structure and function of the seatbelt router 510 can be similar or identical to that of the seatbelt router 154 described above, apart from any differences described herein and/or shown in the figures. Accordingly, similar features will not be described again in detail.

The seatbelt router 510 is configured to be releasably coupled to the chest portion 150 of the seatbelt 118. The seatbelt router 510 includes a base 514, a pair of prongs 518, 522, and a mount 526. The mount 526 extends from a second side 570 of the base 514, opposite a first side 538 from which the prongs 518, 522 extend. The mount 526 is coupled to the tether 158 and can be at least partially received in the aperture 50 of the pillar trim panel 42. The mount 526 includes a protrusion 574 and a bulb 578. In the example provided, the protrusion 574 includes a generally cylindrical shape. The bulb 578 is formed at a terminal end 582 of the protrusion 574 and has a diameter greater than the protrusion 574 and less than the aperture 50. In the example provided, the bulb 578 is formed of a vibration damping material, such as foam, rubber, or compressible plastic, for example. Alternatively, the protrusion 574 and/or the bulb 578 can be formed and/or surrounded by a layer (not shown) of vibration damping material. The bulb 578 is can seat in the aperture 50 of the pillar trim panel 42 and absorb vibrations between the seatbelt router 154 and the pillar trim panel 42 to inhibit rattling of the seatbelt router 510 relative to the pillar trim panel 42. The tether 158 can be tied to, looped to and/or otherwise attached to the mount 526 at the terminal end 582. The bulb 578 inhibits the tether 158 from detaching from or sliding off of the protrusion 574.

Figure 6:
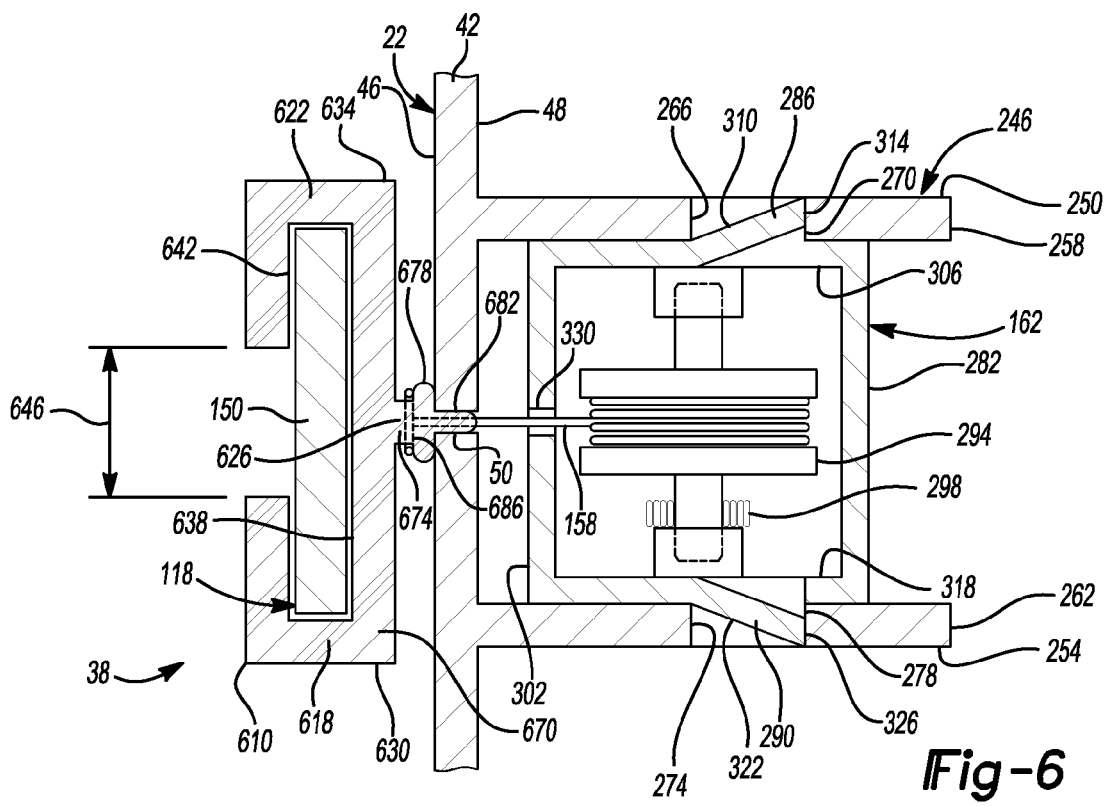
FIG. 6 is a sectional view similar to FIG. 3 illustrating the seatbelt positioner of FIG. 3 having a seatbelt router of a third construction.

With reference to FIG. 6, a seatbelt router 610 of a third construction can be incorporated into the restraint positioner 38 and can replace the seatbelt router 154 described above. The structure and function of the seatbelt router 610 can be similar or identical to that of the seatbelt router 154 described above, apart from any differences described herein and/or shown in the figures. Accordingly, similar features will not be described again in detail.

The seatbelt router 610 is configured to be releasably coupled to the chest portion 150 of the seatbelt 118. The seatbelt router 610 includes a base 614, a pair of prongs 618, 622, and a mount 626.

The mount 626 extends from a second side 670 of the base 614, opposite a first side 638 from which the prongs 618, 622 extend. The mount 626 is coupled to the tether 158 and can be at least partially received in the aperture 50 of the pillar trim panel 42. The mount 626 includes a protrusion 674, a bulb 678 and a nub 682. In the example provided, the protrusion 674 includes a generally cylindrical shape. The bulb 678 is formed at a terminal end 686 of the protrusion 674 and has a diameter greater than the protrusion 674 and greater than the aperture 50. The nub 682 is formed on a side of the bulb 678 opposite the protrusion 674 and extends from the bulb 678 coaxially with the protrusion 674 and bulb 678. The nub 682 is a diameter less than the aperture 50. In the example provided the bulb 678 and nub 682 are formed of a vibration damping material, such as foam, rubber, or compressible plastic, for example. Alternatively, the bulb 678 and/or nub 682 can be surrounded by a layer (not shown) of vibration damping material. The nub 682 can be received in the aperture 50 of the pillar trim panel 42 and to seat the bulb 678 around the aperture 50. The bulb 678 and nub 682 can absorb vibrations between the seatbelt router 610 and the pillar trim panel 42 to inhibit rattling of the seatbelt router 610 relative to the pillar trim panel 42. The tether 158 can be tied to, looped to and/or otherwise attached to the mount 626 at the terminal end 686. The bulb 678 inhibits the tether 158 from detaching from or sliding off of the protrusion 674.

Figure 7:
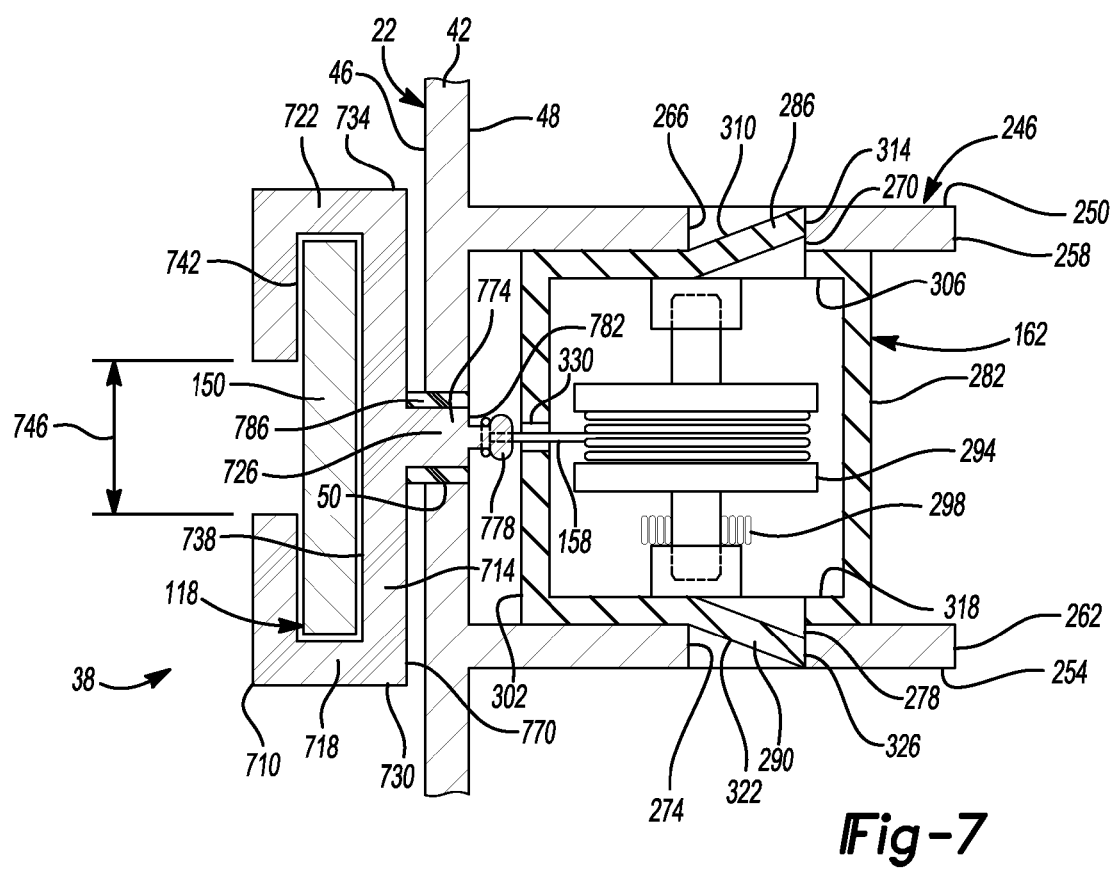
FIG. 7 is a sectional view similar to FIG. 3 illustrating the seatbelt positioner of FIG. 3 having a seatbelt router of a fourth construction.

With reference to FIG. 7, a seatbelt router 710 of a fourth construction can be incorporated into the restraint positioner 38 and can replace the seatbelt router 154 described above. The structure and function of the seatbelt router 710 can be similar or identical to that of the seatbelt router 154 described above, apart from any differences described herein and/or shown in the figures. Accordingly, similar features will not be described again in detail.

The seatbelt router 710 is configured to be releasably coupled to the chest portion 150 of the seatbelt 118. The seatbelt router 710 includes a base 714, a pair of prongs 718, 722, and a mount 726.

The mount 726 extends from a second side 770 of the base 714, opposite a first side 738 from which the prongs 718, 722 extend. The mount 726 is coupled to the tether 158 and can be received in the aperture 50 of the pillar trim panel 42. The mount 726 includes a protrusion 774, and a bulb 778. In the example provided, the protrusion 774 includes a generally cylindrical shape. The bulb 778 is formed at a terminal end 782 of the protrusion 774 coaxially with the protrusion 774. The protrusion 774 has a diameter less than the diameter of the aperture 50. The bulb 778 has a diameter less than the diameter of the protrusion 774. The mount 726 can also optionally include a vibration damper 786. In the example provided, the vibration damper 786 is a layer of vibration damping material, such as foam, rubber, or compressible plastic for example, that is disposed about the protrusion 774. Alternatively, the protrusion 774 can itself be formed of vibration damping material. The vibration damper 786 can seat on the pillar trim panel 42 in the aperture 50 to absorb vibrations between the seatbelt router 710 and the pillar trim panel 42 to inhibit rattling of the seatbelt router 710 relative to the pillar trim panel 42. The tether 158 can be tied to, looped to and/or otherwise attached to the mount 726 between the bulb 778 and the terminal end 782. The bulb 778 inhibits the tether 158 from detaching from or sliding off of the mount 726.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A seatbelt positioner for a vehicle including a pillar and a seatbelt, the seatbelt positioner comprising:
a cassette mounted to a first side of the pillar;
a router including a guide body, a mount, and a damper, said guide body configured to releasably couple said router to a portion of the seatbelt, said mount extending from said guide body, said damper being mounted to one of said guide body or said mount, said router being movable between an extended position in which said router is spaced apart from the pillar, and a retracted position in which said mount is at least partially received in an aperture defined by the pillar and said damper contacts said pillar, said damper being formed of a compressive material configured to dampen motion of said router relative to the pillar when said router is in said retracted position; and
a tether having a first end coupled to said cassette and a second end coupled to said mount, said tether extending through the aperture defined by the pillar to a second side of the pillar when said router is in said extended position;
wherein said cassette is configured to retract said tether toward said cassette to position said router in said retracted position.

2. The seatbelt positioner of claim 1, wherein said cassette includes a spool and a biasing member, said spool being rotatable relative to the pillar, said first end of said tether being coupled to said spool, said biasing member being configured to bias said spool toward a first rotational position in which said tether is wound onto said spool.

3. The seatbelt positioner of claim 1, wherein said mount has a generally conical shape.

4. The seatbelt positioner of claim 1, wherein said mount is a generally cylindrical shape having a diameter less than a diameter of the aperture defined by the pillar.

5. The seatbelt positioner of claim 4, wherein said router includes a bulb spaced apart from said guide body by the mount, said bulb having a diameter less than said mount.

6. The seatbelt positioner of claim 4, wherein said router includes a bulb spaced apart from said guide body by the mount, said bulb having a diameter greater than said mount.

7. The seatbelt positioner of claim 1, wherein said guide body is generally C-shaped, the portion of the seatbelt being removably received through an opening of said C-shaped guide body.

8. The seatbelt positioner of claim 1, wherein said cassette is disposed within the pillar.

9. A seatbelt positioner for a vehicle including a pillar and a seatbelt, the seatbelt positioner comprising:
a cassette mounted to the pillar;
a guide body defining a channel configured to receive a portion of the seatbelt, said guide body configured to releasably retain the portion of the seatbelt within said channel;
a mount coupled to said guide body and including a conically shaped protrusion and a damper, said damper surrounding a portion of said protrusion; and
a tether having a first end coupled to said cassette and a second end coupled to said mount;
wherein said guide body is movable between an extended position in which said guide body is spaced apart from the pillar, and a retracted position in which said damper contacts said pillar, said damper being formed of a compressive material configured to dampen motion of said mount relative to the pillar when said damper contacts the pillar; and
wherein said cassette is configured to retract said tether to position said guide body in said retracted position.

10. The seatbelt positioner of claim 9, wherein said cassette includes a spool and a biasing member, said spool being rotatable relative to the pillar, said first end of said tether being coupled to said spool, said biasing member being configured to bias said spool toward a first rotational position in which said tether is retracted.

11. The seatbelt positioner of claim 9, wherein said cassette is disposed on a first side of the pillar and said guide body is disposed on a second side of the pillar opposite the first side, and said tether extends through an aperture defined by the pillar.

12. The seatbelt positioner of claim 11, wherein said conical protrusion is at least partially received in the aperture defined by the pillar when said guide body is in said retracted position.

13. The seatbelt positioner of claim 9, wherein said guide body is generally C-shaped, the portion of the seatbelt being removably received through an opening of said C-shaped guide body.

14. The seatbelt positioner of claim 9, wherein said cassette is disposed within the pillar.

* * * * *